A. C. TAYLOR.
ELECTRODE POINT FOR SPOT WELDING MACHINES.
APPLICATION FILED DEC. 29, 1911.
1,096,205.
Patented May 12, 1914.
2 SHEETS—SHEET 1.
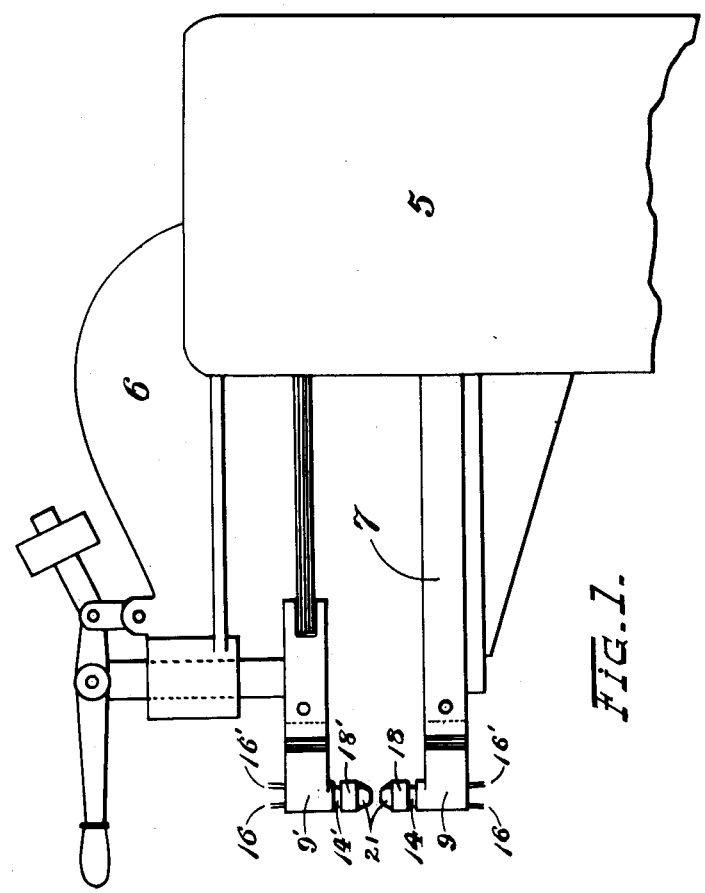
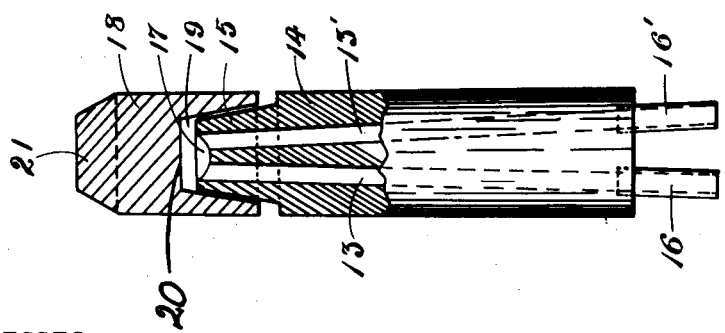
WITNESSES:
Ward Schryver.
J. B. Cole.
INVENTOR
Albertis C. Taylor.
BY Geo. W. Upton,
Attorney

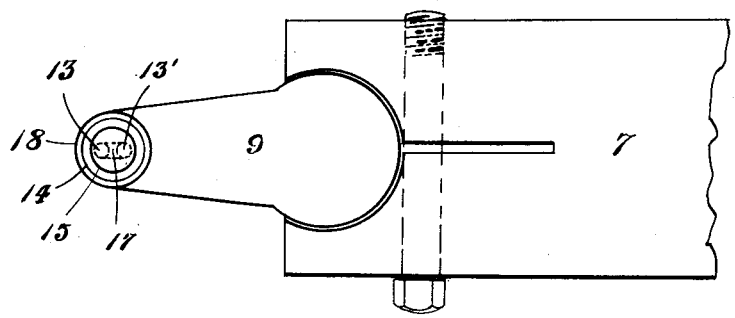
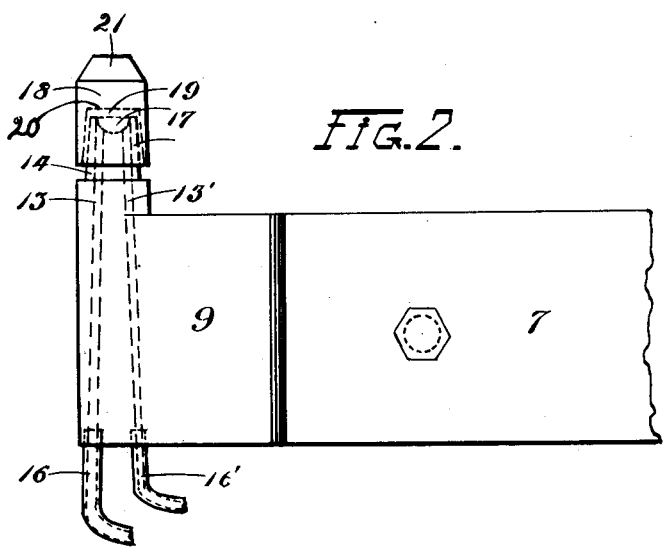

UNITED STATES PATENT OFFICE.

ALBERTIS C. TAYLOR, OF WARREN, OHIO, ASSIGNOR TO THE NATIONAL ELECTRIC WELDER COMPANY, OF WARREN, OHIO, A CORPORATION OF OHIO.

ELECTRODE-POINT FOR SPOT-WELDING MACHINES.

1,096,205.     Specification of Letters Patent.     Patented May 12, 1914.

Original application filed August 7, 1911, Serial No. 642,707. Divided and this application filed December 29, 1911. Serial No. 668,418.

*To all whom it may concern:*

Be it known that I, ALBERTIS C. TAYLOR, a citizen of the United States of America, residing at Warren, in the county of Trumbull and State of Ohio, have invented certain new and useful Improvements in Electrode-Points for Spot-Welding Machines, of which the following is a specification.

My invention pertains to improvements in electric welding machines such as are described and illustrated in my pending application for Letters Patent, Serial Number 642,707, filed August 7th, 1911, and from and of which this application is a divisional part covering such parts of said application No. 642,707 as I have withdrawn therefrom, and relates particularly to electric welding machines in which pairs of electrodes are brought to bear on opposite sides of corresponding spots of a plurality of metals, usually sheets, though wires and rods are often welded in the same way, for the purpose of welding the metals together at said spots. However, my improvements are easily modified, by any mechanic, for use on other welding machines in which the electrodes may have ends of forms other than as illustrated.

The first object of my improvement is to overcome the inconvenience, loss of time and renewal of electrode points and holders now resulting from the malformation rapidly acquired by the electrode points through use thereof, as more particularly pointed out in the description and claims.

A second object is to provide a novel and more effective means of cooling the electrode welding points.

Other objects and resultant improvements will be noted in the description following and in the claims.

I attain these objects by the mechanism illustrated in the accompanying drawings in which:--

Figure 1 shows the top of a conventional spot welding machine with my improvements as to the welding point holders operatively placed thereon; Fig. 2 is an elevation of the lower electrode supporting arm of the machine bearing my improvement; Fig. 3 is a plan of the same; and Fig. 4 is a section of my improved electrode point and cap for spot welding.

Similar characters refer to similar parts throughout the several views.

5 is the upper part of an electric welding machine to which upper and lower electrode supporting arms 6 and 7 are attached to support the upper and lower electrode holders, 9 and 9'.

14, 14' are electrode points seated in the outer ends of electrode holders 9, 9' in any convenient manner, or they may be turned up as integral parts of the electrode holders 9, 9'. Said points 14, 14' I taper slightly at their outer ends 15, 15', and provide bores 13, 13' for the reception of two converging water tubes 16, 16', (Fig. 2) in each point 14, 14', which open into a common channel 17, at the extreme ends of the respective points 14, 14'.

18 is a cap having a conoidal interior pocket 19, (Fig. 4) corresponding as to the taper of its walls to the taper 15 of the electrode point 14, and slightly deeper than the length of taper 15, so as to form a water pocket between the extreme end of point 14, and the face 20 of cap 18. For accuracy in spot welding I reduce the diameter of cap 18 at its outer end so as to form a dull, flattened point 21.

In practice the electrode points 14, 14' of necessity soften with heat and, by the pressure of constant use, flatten and broaden at their extreme ends and also become more or less rough and irregular. When that occurs in the use of my improvement one has but to remove the caps 18, 18' and put on new ones, thus avoiding the necessity of replacing the entire electrode points 14, 14', or of tooling their ends.

I am aware that prior to my invention means have been devised and used to cool welding electrodes both with and without the use of water for the purpose, and I, therefore, do not claim the use of water as a cooling medium broadly; but,

I claim:

1. The combination of an electric welding machine having electrode supporting arms; electrodes positioned in said arms; tapered points carried by said electrodes; caps on said points homogeneously, interiorly tapered, and a channel for a flow of water between said caps and said points, for the purpose set forth.

2. Electrodes, for welding machines, with ends tapered and corresponding removable protecting welding caps having interior tapered cavities corresponding to the tapers of said ends and deeper than the length of the tapered portion of said ends; for the purpose set forth.

3. Means for cooling the ends of spot welding points consisting of the combination with tapered ends to said points; of hollow interiorly tapered caps over said points; tubes for the entrance and exit of water inside of said points; and open connection for the passage of water at the ends of said tubes, within the hollows of said caps.

4. A cap for electric welding electrode points having an interior water pocket conoidal in form, deeper than the tapered end of said point and homogeneously tapered to fit on said point, for the purpose set forth.

5. A removable welding point for spot welding, interiorly tapered to receive and retain the end of a pointed electrode while in operation.

6. A cap for electric welding electrode points having an interior water pocket, deeper than the entering end of said point and homogeneously tapered to fit on said point, for the purpose set forth.

In testimony whereof I affix my signature in presence of two witnesses.

ALBERTIS C. TAYLOR.

Witnesses:
Wm. A. Wilson,
G. W. Upton.